United States Patent [19]

Eppler

[11] 4,205,996
[45] Jun. 3, 1980

[54] COO FREE BLACK SPINEL CERAMIC PIGMENT CONTAINING NIO, FE$_2$O$_3$ AND CR$_2$O$_3$

[75] Inventor: Richard A. Eppler, Timonium, Md.

[73] Assignee: SCM Corporation, Cleveland, Ohio

[21] Appl. No.: 33,440

[22] Filed: Apr. 26, 1979

[51] Int. Cl.$^2$ .................... C09C 1/24; C09C 1/34; C09C 1/40
[52] U.S. Cl. .................... 106/302; 106/304
[58] Field of Search .................... 106/302, 304

[56] References Cited

U.S. PATENT DOCUMENTS

| | | | |
|---|---|---|---|
| 2,309,173 | 1/1943 | Diehl | 106/304 |
| 2,811,463 | 10/1957 | Burgyan | 106/304 |
| 3,528,839 | 9/1970 | Weber | 106/302 |
| 3,561,989 | 2/1971 | Weber | 106/304 |
| 4,075,029 | 2/1978 | Nuss | 106/302 |

OTHER PUBLICATIONS

"Classification and Chemical Descriptions of Mixed Metal Oxide Inorganic Colored Pigments", The Dry Color Manufacturer's Association, Arlington, Va., pp. 7 & 18.

*Primary Examiner*—O. R. Vertiz
*Assistant Examiner*—Mark Bell
*Attorney, Agent, or Firm*—Merton H. Douthitt

[57] ABSTRACT

Although free of CoO, the present spinel ceramic pigments have intensity of black coloration comparable to those using cobalt; they are nickel-rich, selected compositions in the NiO-MnO-CuO-Fe$_2$O$_3$-Cr$_2$O$_3$-Mn$_2$O$_3$-V$_2$O$_3$-Al$_2$O$_3$ system, and they can be used with glaze frits containing up to about 10% ZnO.

8 Claims, No Drawings

COO FREE BLACK SPINEL CERAMIC PIGMENT CONTAINING NIO, FE₂O₃ AND CR₂O₃

This invention relates to a new kind of black pigment, process for making same, and glazes and glazed objects containing same.

Heretofore some black spinel ceramic pigments have been made. The most desirable have been based upon the use of cobalt. The Dry Color Manufacturer's Association (DCMA) of 1117 N. 19th St., Suite 100, Arlington, Va. 22209, has published a brochure (1979) entitled *Classification and Chemical Descriptions of Mixed Metal-Oxide Inorganic Colored Pigments*. It is believed to teach the art closest to the present invention, particularly at pages 7 and 18.

BROAD STATEMENT OF THE INVENTION

The instant invention is strongly based on nickelous oxide; the tetrahedral sites of the resulting spinel must have at least about 0.4 mol of NiO per mol of total metal oxide in their makeup. The fact that nickel can be used this way to give a black color is surprising in itself. In the instant material NiO is neither an optional material nor a modifier; it is fundamental to the tetrahedral sites of the structure. Basically, one can consider this spinel as an unobvious offshoot of the nickel-iron-chromite system.

The product advantageously is made from ceramic grade raw materials, usually oxides, carbonates, hydroxides and the like, which, upon being calcined at high temperature, will be converted into the spinel structure with the named oxides in the proper proportions. Such temperature generally is between about 1900° and 2400° F., preferably about 2,000° and 2,300° F. Typically saggers are used for the calcination in batch production.

The instant spinel pigment exhibits black coloration and has the following broad oxide composition expressed in mols:

| | | |
|---|---|---|
| NiO | 0.4–1 | |
| CuO | 0–0.5 | Group I |
| MnO | 0–0.6 | |
| $Fe_2O_3$ | 0.2–0.8 | |
| $Cr_2O_3$ | 0.2–0.8 | |
| $Mn_2O_3$ | 0–0.4 | Group II, |
| $Al_2O_3$ | 0–0.15 | |
| $V_2O_3$ | 0–0.15 | | with the proviso that the molar sum of Group I is unity, and with the further proviso that the molar sum of Group II is approximately unity.

By "approximately unity" what is meant is a mol of Group II oxide ingredients ±0.05 mol (per mol of Group I oxide ingredients).

DETAILED DESCRIPTION OF THE INVENTION

The instant products are useful as ceramic pigments to impart an intense black coloration to ceramic coatings and glazes; e.g. compositions for glazing tile objects and the like. The pigment also is useful for coloring ceramic bodies, glazing dinnerware, sanitary ware (stable at Cone 10) and hobbyware, and making glass colors. An admixture of the pigment and frit (both finely-ground) customarily is fired as a glaze over tile and the like.

While many pigment compositions have spinel structure, most of them give coloration other than black, e.g. green, blue, or brown. The instant product has a high tinting strength, or, stated otherwise, a high intensity of color. It also resists attack by, for example, a glaze frit admixed with it, as during a firing operation to glaze bisque ware. Presently available cobaltfree black ceramic pigments can only stand temperatures of firing up to about 800° C. in such service. At about 1,000° C. such pigment breaks down and dissolves in many useful glazes, usually yielding a green color.

The inventive spinel pigments of this application have the following ultimate oxidic composition:

| | Oxide | Broad Mols | Preferred Mols |
|---|---|---|---|
| Group I | NiO | 0.4–1 | 0.5–1 |
| | CuO | 0–0.5 | 0–0.5 |
| | MnO | 0–0.6 | 0–0.5 |
| Group II | $Fe_2O_3$ | 0.2–0.8 | 0.25–0.75 |
| | $Cr_2O_3$ | 0.2–0.8 | 0.25–0.75 |
| | $Mn_2O_3$ | 0–0.4 | 0–0.3 |
| | $Al_2O_3$ | 0–0.15 | 0–0.125 |
| | $V_2O_3$ | 0–0.15 | 0–0.125 | with the proviso that the molar sum of Group I is unity and with the further proviso that the molar sum of Group II is approximately unity.

Very small proportions of extender materials such as silica, e.g. from sand or clay, can be present, but do not go to the spinel structure and don't give color. They are merely diluents as to color. Silica, however, can tend to harden the resulting glaze. It can be used up to roughly 5% by weight as a component of the instant black pigment. Likewise, $SnO_2$ could be expected to modify and extend as a diluent without being in the spinel structure. Zinc is undesirable as it tends to give brown when it gets into a spinel structure. Incidental impurities of about 3–5% maximum are usually considered the limits of tolerance for the instant black pigment.

When the nickel oxide (NiO) is reduced below about 0.4 mol in the above composition, a brown color results. As the manganese monoxide concentration is increased above about 0.6 mol or the cuprous oxide concentration is increased above about 0.5 mol, brown pigments result. The presence of zinc oxide in the spinel also can cause brown pigments.

If the concentration of ferric oxide is reduced below about 0.2 mol or the concentration of chromium trioxide is increased above about 0.8 mol, a green pigment results. Conversely, if the concentration of ferric oxide is increased above about 0.8 mol or the concentration of chromium oxide is reduced below about 0.2 mol, a brown pigment results. Increasing the concentration of manganese trioxide above about 0.4 mol yields a brown pigments, as does increasing the aluminum oxide concentration above about 0.15 mol. Increasing the concentration of vanadium trioxide above about 0.15 mol tends to yield byproducts that ruin the smooth surface of an ordinary glaze into which the instant black pigment might otherwise be introduced.

The following examples show ways in which this invention has been practiced, but should not be construed as limiting the same.

EXAMPLE 1–10

Batches were made up of raw batch ingredients measured to yield the fired-out oxide compositions of spinel structure listed in Examples 1–10. Such batches used raw materials from the group consisting of nickelous carbonate, yellow ferric hydroxide, chrome oxide ($Cr_2O_3$), manganous carbonate, ammonium metavanadate, calcined alumina, and black cupric oxide. The pigment batches corresponding to the exemplary compositions were compounded, blended together, and pulverized to insure thorough mixing. The raw batch mixtures were placed in saggers, covered, positioned within a furnace, and calcined in air at temperatures between 2,000° and 2,300° F. After calcining and cooling to room temperature calcined pigment was removed from its sagger and again pulverized.

| Oxide | Molar Compositions EXAMPLE NO. | | | | | | | | | |
|---|---|---|---|---|---|---|---|---|---|---|
| | 1 | 2 | 3 | 4 | 5 | 6 | 7 | 8 | 9 | 10 |
| NiO | 1.00 | 1.00 | 0.50 | 1.00 | 1.00 | 1.00 | 0.50 | 0.875 | 0.975 | 0.90 |
| CuO | — | — | 0.50 | — | — | — | — | — | — | — |
| MnO | — | — | — | — | — | 0.50 | 0.125 | 0.025 | 0.10 | — |
| $Fe_2O_3$ | 0.50 | 0.35 | 0.50 | 0.25 | 0.75 | 0.4375 | 0.25 | 0.4375 | 0.4875 | 0.40 |
| $Cr_2O_3$ | 0.50 | 0.35 | 0.50 | 0.75 | 0.25 | 0.4375 | 0.50 | 0.50 | 0.50 | 0.50 |
| $Mn_2O_3$ | — | 0.30 | — | — | — | — | 0.25 | 0.0625 | 0.0125 | 0.05 |
| $Al_2O_3$ | — | — | — | — | — | 0.125 | — | — | — | — |
| $V_2O_3$ | — | — | — | — | — | — | — | — | — | 0.05 |

It appears now that the tetrahedral sites which are preponderantly nickel oxide with a little bit of MnO, together with octahedral sites which have essentially all of the chrome and iron and the rest of the manganese made the most desirable black ceramic pigment product.

EXAMPLES 11-23

Eight weight parts of each of the calcined pigments of Examples 1-10 was mixed with 90 weight parts of a commercial glaze frit containing 9.5 wt. % zinc oxide, 10 wt. parts of kaolin, and 50 weight parts of water. This frit is Pemco brand PB 197 (a trademark of SCM Corporation having in net oxide composition (wt. percent): $K_2O$—2.4; $Na_2O$—4.0; CaO—5.9; ZnO—9.5; PbO—11.3; $Al_2O_3$—7.4; $B_2O_3$—6.5; and $SiO_2$—53.0). This mixture was milled in a ball mill for one hour, then sprayed on to bisque tile. The coated tile were then fired at 2,000° F. for an hour to yield a ceramic glaze on such tile. The following table describes the properties of these tests (Examples 11-20) and several collateral tests (Examples 21-23) with conventional black pigments used in otherwise like formulations. The tests were formulated to use a glaze frit containing zinc oxide because such glazes tend to affect conventional black pigments the most detrimentally. As can be seen, this demanding use of all of the exemplary pigments (Examples 11-20) produced a black coloration, which is quite comparable with like cobalt-bearing spinel pigment indicated as Example 23. By way of contrast, like use of currently available non-cobalt-bearing pigments are seen to give green in the case of a copper-chromite spinel pigment (Example 22) and brown in the case of an iron-chrome-hematite pigment (Example 21).

| Example No. | Pigment Used | Visual Appearance | Rd* | a* | b* |
|---|---|---|---|---|---|
| 11 | from Example 1 | Black | 4.1 | 0.1 | 0.2 |
| 12 | from Example 2 | Black | 4.1 | 0.2 | 0.4 |
| 13 | from Example 3 | Black | 6.9 | 0.3 | −1.4 |
| 14 | from Example 4 | Black | 4.6 | 1.7 | 2.1 |
| 15 | from Example 5 | Black | 4.1 | 0.2 | 0.3 |
| 16 | from Example 6 | Black | 4.2 | 0.7 | 0.4 |
| 17 | from Example 7 | Black | 4.3 | 0.5 | 0.6 |
| 18 | from Example 8 | Black | 4.4 | 0.1 | 0.2 |
| 19 | from Example 9 | Black | 4.5 | 0.1 | 0.4 |
| 20 | from Example 10 | Black | 4.7 | 0.2 | 0.1 |
| 21 | Conventional Copper Chromite Spinel | Green | 12.7 | −3.2 | 2.5 |
| 22 | from Iron-Chrome Hematite | Brown | 7.4 | 13.2 | 9.9 |
| 23 | from Cobalt-Bearing Spinel | Black | 4.5 | 0.3 | 1.0 |

*These are measured as standard color differences using a DIANO spectrophotometer having automatic computer calculations of the data.

EXAMPLES 24-30

The third table shows use of six pigments for glazing in a manner like that of Examples 11-20. These pigments were analogous to the instant ones, but outside of the claimed compositional limits. It gives the results of such glazes using said compositions (Example 24-30) in the same way as the claimed ones in the 8 wt. % zinc oxide glaze used above in Examples 11-20.

| Oxide | Molar Compositions Example No. | | | | | |
|---|---|---|---|---|---|---|
| | 24 | 25 | 26 | 27 | 28 | 29 |
| NiO | 1.00 | 1.00 | — | 1.00 | — | 0.25 |
| CuO | — | — | 1.00 | — | — | — |
| MnO | — | — | — | — | 1.00 | 0.75 |
| $Fe_2O_3$ | — | 1.00 | 0.50 | 0.375 | 0.50 | 0.125 |
| $Cr_2O_3$ | 1.00 | — | 0.50 | 0.375 | 0.50 | 0.50 |
| $Mn_2O_3$ | — | — | — | — | — | 0.375 |
| $Al_2O_3$ | — | — | — | 0.25 | — | — |
| Visual Appearance | Dark Green | Dark Brown | Dark Brown | Dark Brown | Dark Brown | Dark Brown |
| Rd | 6.0 | 6.9 | 8.4 | 4.4 | 4.5 | 4.9 |
| a | −4.6 | 2.2 | 2.1 | 1.3 | 1.6 | 1.3 |
| b | 4.1 | 2.0 | −0.4 | 1.2 | 1.7 | 1.7 |

From the foregoing the quality of the instant pigment should be evident. The pigment also can be used in plastics, paint, or other organic or inorganic coatings.

What is claimed is:

1. Spinel pigment exhibiting black coloration and having the following net oxide composition expressed in mols:

| | | |
|---|---|---|
| NiO | 0.4–1 | ⎫ |
| CuO | 0–0.5 | ⎬ Group I |
| MnO | 0–0.6 | ⎭ |
| $Fe_2O_3$ | 0.2–0.8 | |

-continued

| | | |
|---|---|---|
| Cr$_2$O$_3$ | 0.2–0.8 | |
| Mn$_2$O$_3$ | 0–0.4 | |
| Al$_2$O$_3$ | 0–0.15 | |
| V$_2$O$_3$ | 0–0.15 | Group II | with the provisos that the molar sum of Group I is unity and that the molar sum of Group II is approximately unity.

2. The pigment of claim 1 wherein said composition is:

| | | |
|---|---|---|
| NiO | 0.5–1 | |
| CuO | 0–0.5 | |
| MnO | 0–0.5 | Group I |
| Fe$_2$O$_3$ | 0.25–0.75 | |
| Cr$_2$O$_3$ | 0.25–0.75 | |
| Mn$_2$O$_3$ | 0–0.3 | |
| Al$_2$O$_3$ | 0–0.125 | |
| V$_2$O$_3$ | 0–0.125 | Group II | with the provisos that the molar sum of Group I is unity and that the molar sum of Group II is approximately unity.

3. The pigment of claim 1 which contains a small proportion of extender oxide that is not present in the spinel structure and acts essentially as a diluent of the color.

4. A process for making black ceramic pigment which comprises calcining at a temperature of about 1,900°–2,400° F. a raw batch of ceramic grade raw materials in proportions metered to yield a spinel of claim 1.

5. A ceramic frit tinted by admixture with a minor proportion of particles of the pigment of claim 1.

6. A substrate coated with the fired residue of the admixture of claim 5.

7. The coated substrate of claim 6 which is a glazed tile.

8. A ceramic body containing a minor proportion of a pigment of claim 1 sufficient for coloring said body grey.

* * * * *